Dec. 24, 1968   M. B. SAMPSON   3,417,672
ROTARY HYDRAULIC CYLINDER
Filed June 28, 1967   2 Sheets-Sheet 2
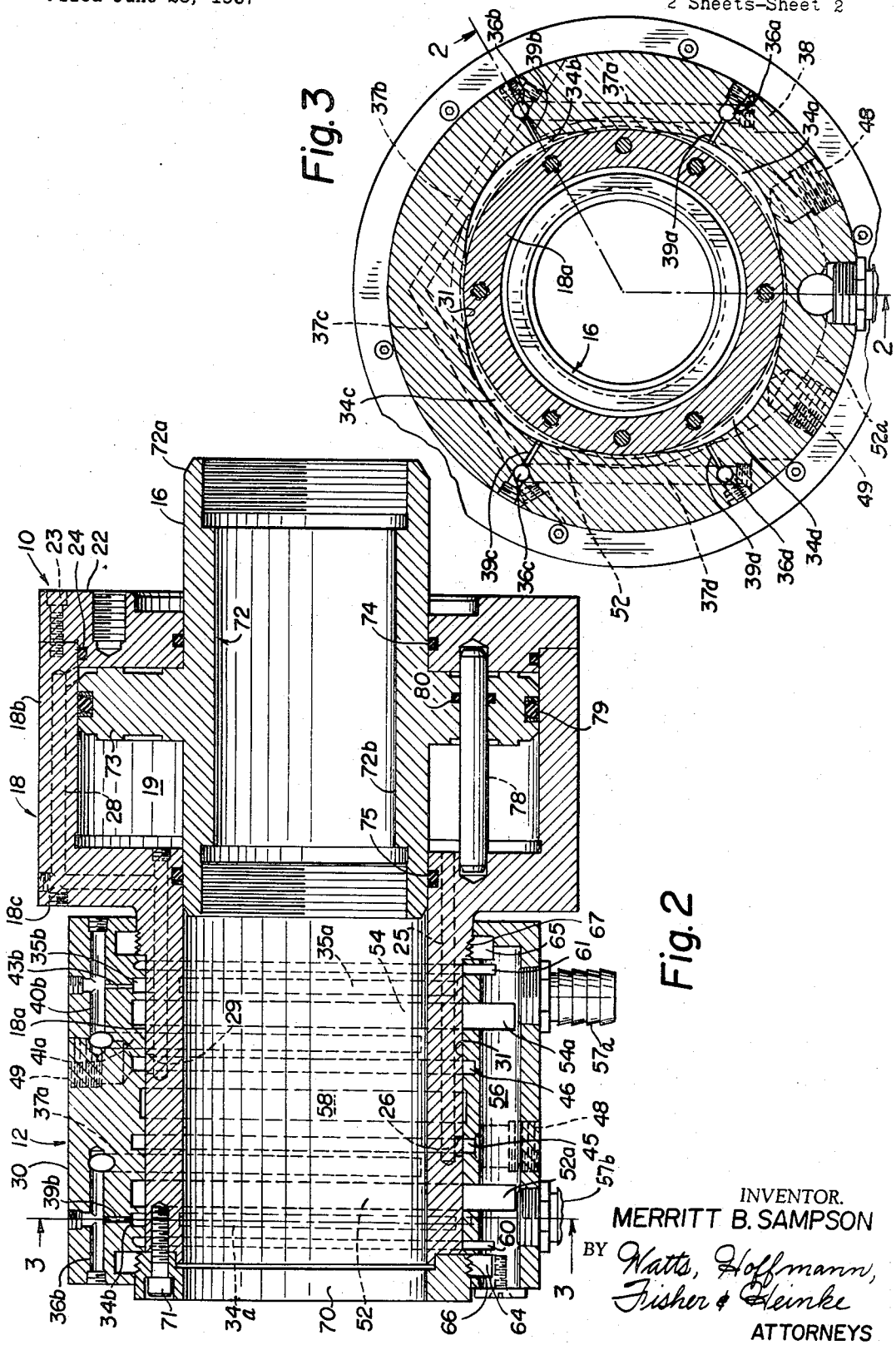
INVENTOR.
MERRITT B. SAMPSON
BY Watts, Hoffmann,
Fisher & Heinke
ATTORNEYS

United States Patent Office 3,417,672
Patented Dec. 24, 1968

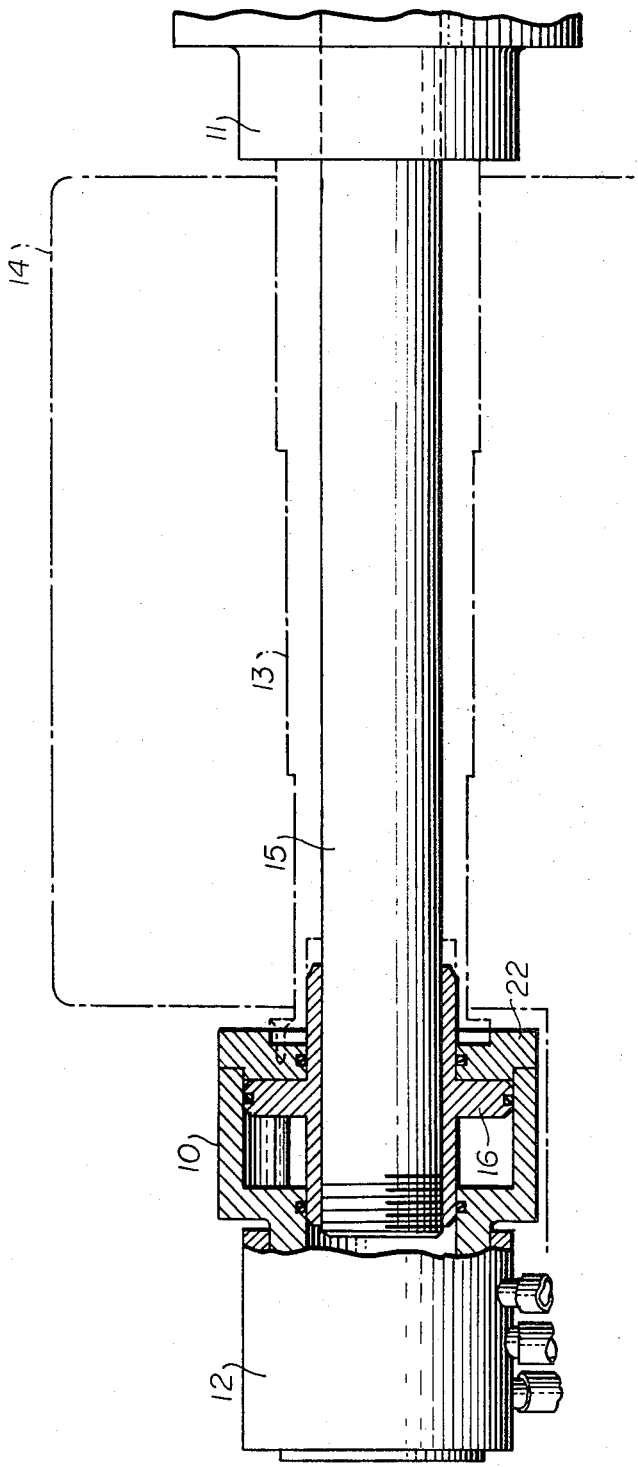

3,417,672
ROTARY HYDRAULIC CYLINDER
Merritt B. Sampson, Shaker Heights, Ohio, assignor to
The S-P Manufacturing Corporation
Continuation-in-part of application Ser. No. 467,346,
June 28, 1965. This application June 28, 1967, Ser.
No. 649,515
19 Claims. (Cl. 92—106)

ABSTRACT OF THE DISCLOSURE

A compact rotary hydraulic cylinder for actuating a work holder, having a non-rotary fluid distributor mating with a portion of the cylinder. Annular grooves in the distributor supply fluid to a rotating piston chamber, interconnected spaced cavities provide a fluid bearing support for the distributor, and drain grooves are distributed along the mating portion.

Cross reference to related application

This application is a continuation-in-part of application Ser. No. 467,346, filed June 28, 1965.

Background of the invention

This invention relates to a rotary hydraulic cylinder, particularly to a horizontal rotary hydraulic cylinder for actuating a rotary work holder of a machine tool.

Certain types of machine tools, such as lathes, utilize a rotary hydraulic cylinder to actuate a rotating, workclamping, chuck or collet. A common arrangement is to mount a work holding chuck on one end of a driven rotary spindle that is supported in the housing of a machine tool. Conventionally, each end of the spindle extends from the housing. A work holding chuck is mounted on one end of the spindle and a hydraulic cylinder containing an axially movable piston is attached to the other end. Both the chuck and the cylinder rotate with the spindle. The movable piston of the hydraulic cylinder is connected by an actuator tube extending through the spindle to a draw cam of collet of the work holding chuck. Fluid introduced into the rotary cylinder moves the piston and the connected actuator tube in an axial direction relative to the spindle to actuate the work clamping member to hold or release the work. Fluid from a source external to the hydraulic cylinder under pressure is supplied to the cylinder as it rotates with the spindle and work holder, to move and hold the piston in one of two terminal positions.

It will be apparent that it is advantageous to utilize as large a piston as possible to obtain maximum power for holding the work with a given fluid pressure. In many instances, however, the construction of the machine tool with which the hydraulic cylinder is used imposes limitations on the diameter of the cylinder, and in any event a small diameter, compact, unit is desirable yet not obtained with known distributors that require roller or ball bearings and outer covers to enclose the bearings and actuating mechanisms, all of which add to the overall dimensions. It is also most important that the unit not generate so much heat that high temperature gradients are applied to the machine tool spindle during operation, because accuracy in the machining operation will be lost. Known units operate at temperatures somewhat above a desirable level. For the most part, therefore, stationary cylinders remote from the rotary spindle have been used in the past to obtain high clamping pressures. These cylinders were generally fastened by brackets at a location remote from the rotary spindle and would avoid space limitations and temperature limitations imposed upon cylinders carried with the spindle. The stationary cylinders were linked to the actuator tube by a lever and slip ring arrangement. However, it will be readily apparent that the remote actuator with its need for mounting brackets and its use of exposed linkages and slip rings is disadvantageous.

Summary of the invention

The present invention is directed to an improved rotary hydraulic cylinder and hydraulic fluid distributor, and has all of the advantages of the cylinder disclosed in the above referenced copending application as well as additional advantages. The cylinder and distributor are constructed so the actuator unit can be mounted directly to the spindle of a machine tool and yet provide a relatively large piston area in proportion to the overall diameter of the unit. Basically, this is accomplished by utilizing a stationary distributor that surrounds a portion of the rotary cylinder and which is constructed in the form of an improved cylindrical fluid bearing having affective fluid end seals. This construction not only eliminates the need for roller bearings between the rotary cylinder and fixed distributor, and the accompanying space requirements and wear, but also utilizes the distributor wall as the outer housing of the rotary hydraulic cylinder. This latter feature effects a substantial reduction in overall size.

Important additional features and advantages of the present invention over the cylinder in the referenced application include (1) separate fluid inlets for operating the actuating piston and for providing hydrostatic bearing support between the stationary distributor and the rotating actuating cylinder, permitting lower and independently controlled bearing support pressure, (2) improved drainage area from the bearing surface to assure proper flow of fluid through the bearing and to minimize or eliminate hot spots and the accompanying thermal distortion of the bearing, and (3) the reduction of the total area at the bearing surface where hydraulic fluid is subjected to a shearing action, by relieving a substantial area of the bearing surface. This last feature in particular, as well as the use of low bearing support pressure, substantially reduces the operating temperature of the bearing and thus reduces the temperature gradient to which the machine tool spindle is subjected. This in turn minimizes changes in the way the machine tool spindle runs and thereby contributes to greater accuracy in the machining operation.

In the present construction, fluid under pressure for operating the movable piston of the hydraulic cylinder is supplied to the distributor through inlets separate from inlets that supply fluid to support the distributor. Fluid to operate the piston is supplied to the distributor through one of two ports, which function alternately as fluid inlets and outlets, depending upon which direction the piston of the cylinder is actuated. The fluid is introduced from one port into one of two annular, axially spaced, grooves in the inside wall or bearing surface of the distributor. From this groove it flows to conduits in the cylinder wall that open opposite the groove. The conduits communicate with one end of the cylinder. Other conduits open opposite the other groove and communicate with the opposite end of the cylinder. When the piston is moved by fluid pressure supplied through one port and groove, fluid exhausts from the opposite end of the cylinder through the other annular groove and port.

An important feature of this invention is the provision of controlled pressure zones and fluid flow to bearing surfaces between the distributor and the cylinder to minimize friction between the two. The distributor is spaced from the cylinder by fluid flowing to pressure zones formed by cavities in the distributor wall. This flow is provided from a source of fluid separate from and at a lower pressure than the fluid used to actuate the piston. Fluid is introduced to the pressure zones of groups of cavities from interconnected passageways in the distributor wall, assuring uniform pressure to all zones of a group. The passageways are restricted at the cavities to provide a pressure drop so that the fluid support for the rotary cylinder does not vary appreciably with momentary variations in fluid pressure or load.

The cavities defining the fluid pressure zones are arranged in two axially spaced groups closely adjacent opposite ends of the distributor for stable support, being spaced inwardly only enough to provide adequate bearing surface or sill area at the ends of the distributor to minimize leakage and to allow space for the provision of end seal drain grooves. The cavities in each group are spaced circumferentially about the inside of the distributor wall. The grooves that supply and carry away fluid to and from the cylinder are located between the two groups of cavities in a central portion of the bearing surface of the distributor wall.

In order to effectively isolate the fluid flows of the two input sources to the distributor, two annular drain grooves are located in the bearing wall of the distributor, each axially between one of the input or exhaust grooves and an adjacent group of cavities. Axial flow of fluid along the bearing wall from either the grooves or the cavities toward the other is intercepted by a drain groove and returned to a reservoir. The drains are constructed with a large outlet area that will accommodate the inflowing volume of fluid from the capillaries and carry it from the bearing surface without creating significant back pressure to the fluid flow through the bearing.

In addition to such drain grooves that serve as conduits in the bearing surface, additional surface relief is provided by an annular groove between the drain grooves, for the sole function of reducing the surface area of the bearing that is closely spaced from the cylinder surface.

A further important feature of this invention is an improved, highly effective, open seal, which is provided at each end of the fluid distributor. This seal substantially reduces or eliminates leakage from the bearing even at high operating temperatures and when relatively high fluid pressures are used.

The effective fluid support provided by the construction of the fluid distributor, coupled with the improved open seal (1) results in a bearing that operates at a low temperature as compared with any known devices without supplementary cooling, (2) permits the use of extremely high rotational speeds, significantly higher than speeds previously used with the cylinder and distributor disclosed and claimed in the above mentioned copending application, and (3) reduces the flow and loss of fluid. In addition, the above advantages have been attained essentially without sacrifice in size or cost over the cylinder and distributor disclosed in the referenced application and horsepower loss due to the distributor is as low or lower than that of conventional ball bearing-type distributors which are larger and more costly.

Other features and attendant advantages of this invention will be readily appreciated as the same become better understood by reference to the detailed description that follows when considered in connection with the accompanying drawings.

*Brief description of the drawings*

FIGURE 1 is an elevational view, partly in section, diagrammatically showing the relationship of a rotary spindle of a machine tool, a work holder and the rotary hydraulic cylinder of the present invention;

FIGURE 2 is a sectional view of a bearing and rotary cylinder constructed in accordance with the present invention, taken along the lines 2—2 of FIGURE 3, and looking in the direction of the arrows; and FIGURE 3 is a transverse section of the distributor and rotary cylinder of FIGURE 2 taken along the lines 3—3 of FIGURE 2, looking in the direction of the arrows.

Referring now to the drawings, there is shown a rotary hydraulic cylinder 10 and stationary oil supply distributor 12 surrounding a portion of the cylinder. The cylinder 10 is mounted on a spindle 13 of machine tool 14 with the axis of rotation of the cylinder 10 in a horizontal plane coinciding with that of the spindle. Within the cylinder 10, mounted for axial movement, is an annular piston 16. The annular piston 16 is rotatable with and axially movable relative to the rotating hydraulic cylinder 10. The rotary hydraulic cylinder 10 is adapted to rotate with the spindle 13 and a work holding device 11 of the machine tool 14. Such a work holding device may be a conventional chuck or collet type work holder. An actuating tube 15 is carried within the spindle 13 and is attached to the annular piston 16. Axial movement of the piston 16 and the attached tube 15 actuates the work holding device in a manner well known in the art. In the embodiment shown, the cylinder and actuating tube provide a central passage for receiving an elongated work piece to be clamped by the work holder.

With more particular reference now to the rotary hydraulic cylinder 10, there is provided a cylinder wall 18 having three portions, 18a, 18b and 18c. The wall portion 18a is of smaller diameter than wall portion 18b, and the two are connected by annular wall portion 18c. Wall portion 18a is housed for rotation within the distributor 12. Wall portion 18b, external to the distributor 12, provides a cylinder wall for the piston 16 and, together with annular wall portion 18c and an annular cylinder cover 22, defines a chamber 19 for piston 16. The cover 22 is fastened to the larger diameter end of cylinder wall 18 by machine screws 23. A packing ring 24 in the cylinder cover 22 provides a fluid-tight seal between the cylinder cover 22 and the cylinder wall 18b. The distributor 12 is retained by a ring 70 fastened to cylinder wall 18 through cap screws 71.

Conduits or passageways 25 extend axially within the wall 18a of the rotary cylinder 10. The conduits open at one end through annular wall portion 18c, in direct communication with piston chamber 19. At the other end, they communicate through aperture 26 with the external surface of cylinder wall 18a.

Axially extending conduits or passages 28 are also provided in the cylinder wall 18, peripherally spaced between conduits 25. The conduits 28 extend within wall portions 18a, 18c, and 18b, and open through wall 18b into piston chamber 19 adjacent the cylinder cover 22. Conduits 28 communicate with the external surface of cylinder wall 18a though apertures 29. The apertures 26 and 29 are spaced from each other axially as well as peripherally on cylindrical wall 18a.

More particular reference is now made to the destributor 12 which is formed of a cylindrical wall 30 having a pressure lubricated bearing surface 31. As best shown in FIGURES 2 and 3, the distributor surrounds the small diameter portion 18a of cylinder 10. The inner, or bearing, surface 31 of distributor wall 30 includes two axially spaced groups of four circumferentially spaced shallow cavities 34 and 35. The cavities 34 and 35 of each circumferential group are aligned with each other axially of cylinder 10 on the distributor wall 30 in sets identified by the letters *a, b, c, d,* associated with reference characters 34, 35.

Four short conduits 36a, b, c, d extend axially within the distributor wall 30 opposite a respective cavity 34a, b, c, d. These conduits are connected by a plurality of interconnected peripheral bores 37a, b, c, d to which fluid under pressure can be supplied through an inlet port 38. A radial capillary 39a, b, c, d extends from each bore 37 to a respective cavity 34. The capillaries are of small diameter relative to the axial conduits 36 and provide a pressure drop between the conduits 36 and the cavities 34. The above construction is duplicated with respect to the cavities 35a, b, c, d. Thus, four axial conduits 40 are opposite the cavities 35a, b, c, d, one such conduit 40b being shown in FIGURE 2. These conduits are connected by interconnected peripheral bores 41, one such bore 41a being shown in FIGURE 2. Capillaries 43 connect each of the conduits 40 to one of the cavities 35. Capillary 43b is shown in FIGURE 2. A port (not shown) to the bore 41a and separate from the port 38 but connected to a common source of fluid supplies fluid under pressure to the interconnected bores 41 and thence to the cavities 35.

As best shown in FIGURE 3, the peripherally spaced sets of cavities 35 are spaced to either side of the vertical center line of the bearing wall 30.

Two axially spaced, annular, grooves 45, 46 are formed in the inner, bearing, surface 31 of the distributor wall 30 near the center of the axial length of the wall. A port 48 communicates through the distributor wall 30 to groove 45. A second port 49, peripherally spaced about distributor wall 30 from the port 48, communicates through the distributor wall 30 to groove 46. For illustrative purposes the port 49 is shown out of position in FIGURE 2 to indicate the communication with the groove 46. The true peripheral position is shown in FIGURE 3. Either one of the ports 48, 49 may be connected by a suitable valve arrangement in a fluid supply system (not shown) to a supply of hydraulic fluid under pressure while the other port is connected to exhaust. These grooves communicate continually with passageways 25, 28 to supply and exhaust fluid to and from the piston chamber 19.

Two annular drain grooves 52, 54 are formed in the bearing surface 31 of the distributor wall 30. The drain groove 52 is located axially between the cavities 34 and the groove 45 that communicates with the piston chamber 19. The drain groove 54 is located axially between the cavities 35 and the groove 46 that communicates with the piston chamber 19. Lower portions 52a, 54a of the drain grooves are enlarged to assure adequate drainage and communicate with an axial drain conduit 56 in the wall 30 at the bottom of the distributor 12. These grooves interrupt any axial flow of fluid along the bearing surface 31 between the cavities 34 and the groove 45 and between the cavities 35 and the groove 46 and carry fluid of the interrupted flow to the drain conduit 56. Two drains 57a, 57b then return the fluid to a sump.

An annular spacer groove 58 is located between the annular grooves 45, 46 that supply fluid to the piston chamber 19. This groove serves to reduce the area of the bearing surface 31.

Seal drain grooves 60, 61 are located in the bearing surface 31 axially spaced from the groups of cavities 34, 35 toward the ends of the distributor 12. The seal drain grooves communicate with the axial drain conduit 56 at the bottom of the distributor and interrupt the majority of fluid flow that would otherwise escape from the ends of the bearing surface. Interrupted fluid is carried to the drain conduit 56. The drain grooves 60, 61 and especially the area of communication with the drain conduit 56 are constructed to conduct away most but not all of the fluid that reaches the grooves 60, 61 under typical operating conditions. Thus, a portion of the hydraulic fluid flows beyond the grooves 60, 61 to provide complete lubrication along the inner bearing wall 31.

Annular collecting grooves 64, 65 are provided adjacent opposite ends of the cylindrical distributor wall 30, recessed from the bearing surface 31. Each collecting groove 64, 65 communicates at the lowest portion of the bearing wall 30 with the axially extending drain conduit 56. A plurality of small, closely spaced, annular grooves 66 are formed in the outer surface of the retaining ring 70 that is fastened to the end of the cylinder wall 18a. The grooves 66 are located opposite the collecting groove 64. A second plurality of grooves 67 similar to the grooves 66 are formed in the outer surface of the cylinder wall 18a opposite the collecting groove 65. The small closely spaced grooves 66, 67 collect fluid as it flows out from between the distributor wall 30 and the cylinder wall 18a. The collected fluid is then thrown by centrifugal force into the collecting grooves 64, 65 and flows to the drain conduit 56. This construction provides end seals that effectively prevent external leakage.

Referring now specifically to the piston 16, there is provided a central, cylindrical body 72 extending axially of cylinder 10 and located centrally therein. The cylindrical body 72 is divided into a front portion 72a and a rear portion 72b by an annular flange 73.

The front wall portion 72a of cylindrical body 72 extends through cylinder cover 22. A packing, such as an O-ring 74, provides a fluid-tight, sliding seal between tubular wall 72a and cylinder cover 22. The rear wall portion 72b of the piston 16 extends into the portion of the cylinder 10 having a reduced diameter, as defined by the cylinder wall 18a. A packing, such as an O-ring 75, provides a sliding, fluid-tight seal between the rear portion 72b of piston 16 and the inner surface of cylinder wall 18a. Hence, the central cylindrical body 72 of piston 16 cooperates with wall 18a of cylinder 10 and with cylindrical cover 22 to form an annular piston chamber 19. A pin 78, extending axially between cylinder wall 18c and cover 22 through the piston flange 73 and pin seal 80 allows axial movement of the piston 16 while restraining rotary motion, relative to cylinder 10. A packing, such as an O-ring 79, is provided between the peripheral wall of piston flange 73 and the cylinder wall 18b to provide a fluid-tight, sliding, seal.

In operation, and by way of example, the piston 16, when in the position shown in FIGURE 2, opens the work holder to accept or release a work piece. When the piston 16 is moved in the opposite direction, toward cylinder wall 18c, the jaws or collet of the work holder 11 are closed to hold a work piece. The piston remains biased in this position by fluid pressure to hold the work piece as the spindle 13, work holder 11 and cylinder 10 are rotated.

Hydraulic fluid, such as oil, is introduced by way of a suitable valve arrangement through the port 49 of the distributor 12. At the same time, the port 48 of the distributor 12 is connected to exhaust. The fluid entering port 49 is introduced directly into the annular groove 46 in the inside surface 31 of the distributor wall 30. From the groove, the fluid is forced under pressure to the axial conduits 28. This fluid is introduced to the piston chamber 19 and acts on the annular flange 73 of the piston 16 to move and then bias piston 16 toward cylinder wall 18c (i.e., in a work holding position). As the piston 16 moves toward work holding position, fluid is exhausted from piston chamber 19 through axial conduits 25, apertures 26 in the surface of cylinder wall 18a, and then into the annular groove 45 in distributor wall 30, and out port 48.

Prior to and during rotation of the cylinder 18 in the performance of a machining operation, hydraulic fluid, such as oil, is introduced to the two groups of pressure cavities 34, 35 through the associates peripheral bores 37, 41 and the ports to the bores, one of which is shown at 38. The fluid introduced to the cavities is supplied under pressure independently from the fluid introduced to the ports 48 or 49 and flows through the capillaries 39 and 43, which reduce the pressure of the fluid. The fluid introduced to both groups of cavities is supplied from a common source, assuring substantially uniform pressure at all cavities to maintain the distributor 30 spaced from the wall 18a of the cylinder when the cylinder is rotated.

Fluid escapes from the cavities 34, 35 between the surface of the cylinder at 18a and the inner surface 31 of the distributor 30 in both axial directions on opposite sides of each group of cavities, providing lubrication for the bearing surface 31. Thus fluid from cavities 34 flows to drain grooves 52 and 60 axially spaced on opposite sides of the cavities 34, and fluid from cavities 35 flows to drain grooves 54 and 61. The drain grooves collect the major portion of the fluid and conduct it to the drain conduit 56 and the drain 57. Lubrication is also provided by fluid escaping from the annular grooves 45, 46.

A small portion of the fluid between the distributor 30 and the cylinder wall 18a adjacent the outer ends is not conducted away by the drain grooves 60, 61 and flows to the closely spaced grooves 66, 67 associated with the rotary cylinder. These grooves collect fluid that has escaped the seal drain groves 60, 61 and sling the collected fluid into collecting grooves 64, 65. Thus, the two sets of grooves 60, 61 and 66, 67 provide open seals at opposite ends of the distributor that prevent leakage of fluid even under high operating speeds and pressures.

During a machining operation, the cylinder 10 is rotated with the spindle 13 and work holding device 11. Upon completion of a machining operation, the rotation of the cylinder 10 is stopped, port 49 is connected to exhaust and port 48 is connected to fluid under pressure, and the flow of fluid to the piston chamber is reversed. Piston 16 is shifted axially toward cylinder cover 22, thereby releasing the work piece. Fluid continues to be supplied under pressure to the bearing surface of the distributor wall 30 through peripheral bores 37, 41.

Typically, fluid is supplied to one of the grooves 45, 46 at approximately 500 pounds per square inch gauge to operate the piston 16. The other of the two grooves connected with exhaust is at a pressure of zero. The pressure of any fluid that leaks from the input groove into the gap between the cylinder wall 18a and the bearing surface 31 of the distributor is reduced by the restricted path formed by the gap. Axial flow of fluid leakage is intercepted by drain grooves 52, 54. Fluid is supplied to the peripheral bores 37, 41 through the respective ports (port 38 for bores 37 being shown in FIGURE 3) at a pressure typically of about 100 pounds per square inch gauge. The pressure of this fluid is reduced by the capillary restrictions 39a–d and 43a–d and applied under uniform pressure to the cavities 34a–d and 35a–d. The cavities 34, 35 are sufficiently large to support the distributor with a relatively low fluid pressure.

Many advantages accrue from the present construction and operation and it has been determined that several factors including certain relationships in the construction or geometry of the fluid distributor must be observed to achieve these advantages. The operating characteristics depends upon such parameters as the bearing geometry, bearing clearance, fluid viscosity, fluid pressure and the operating temperature. The interrelationships of these parameters is especially important in achieving improved results in the important areas of bearing operating temperature and leakage.

If fluid bearing pressures are too high and fluid flow too great, oil consumption and leakage are high, drainage is inadequate and hot spots can develop along the bearing. In the present invention relatively low fluid pressures of about 100 pounds per square inch gauge are used. Capillaries approximately 0.025 inch in diameter further reduce the pressure to the cavities. This pressure is adequate for support yet keeps the flow rate of fluid to the bearing relatively low. By comparison to the fluid inlet area provided by the capillaries of each group of four cavities and the gap between the distributor and cylinder at the supply groove, a large drain area is provided. The drain groove 52 or 54 associated with each group of cavities 34 or 35 has a drain outlet area from the bearing surface provided by a lower portion 52a or 54a of each groove. This drain outlet area is at least 15 times greater than the sum of the capillary inlet area of the associated four cavities and the area of the gap from an adjacent side of a supply groove 45 or 46, and preferably more. For example, in a preferred arrangement the drain outlet area is at least 30 times as great as the capillary inlet area and gap area of the adjacent supply groove. This relationship of drainage area to inflow area assures adequate circulation of bearing fluid and eliminates any back-up flow in the bearing.

Groove 52 and drain 52a collect leakage from cavities 34 and inlet groove 45, which are on opposite sides thereof. The land or sill between drain groove 52 and inlet groove 45 is large, i.e., wide in the axial direction of the distributor, to prevent undue leakage of the high pressure fluid supplied to groove 45. The land or sill between drain groove 52 and the cavities 34 can be substantially smaller because the support pressure is lower. In order to keep the axial length of the distributor to a minimum, the land or sill between the cavities 34 and drain groove 52 should be as small as possible and because of the independent lower pressure to the cavities, this land or sill area can be less than one-half the width of the land or sill between the groove 52 and the groove 45. The same is true with respect to the land or sill area between the drain groove 54 and the supply groove 46 on one side and the cavities 35 on the other side.

The shearing of fluid between the bearing surface of the distributor and the cylinder is a primary cause of heat generated by the unit. It is highly desirable if this heat can be maintained below operating temperatures of 170 to 180 degrees Fahrenheit currently found in present known equipment. To reduce fluid shear and the generation of excessive heat from the relative rotation between the distributor and the cylinder of the present device, the inner bearing surface between the distributor and cylinder should be relieved (i.e., recessed to provide a greater clearance than the bearing clearance) over at least 30 percent of the bearing area, and preferably over approximately 50 percent of the bearing area. For example, in the present device described, a bearing of 5½ inches in diameter and 6⅜ inches in length has a bearing clearance with the cylinder of 0.001 inch and approximately 50 percent of the area of the surface 31 is relieved by the cavities 34, 35, and and grooves 52, 54, 58, 60 and 61. The units runs at a temperature of about 130 degrees Fahrenheit, which is significantly cooler than previously known units. From the standpoint of eliminating shear, relieved portions can be located in either or both of the adjacent bearing surfaces since it is the existence of surface areas relatively spaced that is important.

The effective open end seal of the present construction, which prevents loss of fluid from the ends of the distributor, has made possible a low friction distributor in which fluid consumption is low and leakage eliminated even at high operating temperatures, such as 160 degrees Fahrenheit, well above the temperatures at which the unit normally operates.

By locating the drain grooves and oil collecting grooves within the bearing wall of the distributor itself, the need for a separate housing surrounding the distributor has been obviated. By locating the distributor axially spaced from the piston chamber and about a portion of the cylinder of reduced diameter, the distributor need not be of larger diameter than the piston chamber. Thus, the diameter of the piston may be maximized for the available space or clearance afforded by the construction of the machine tool; and the distributor, by not requiring a surrounding housing to supply and/or collect the flow of support fluid, requires no additional clearance, with respect to the machine tool, over that of the piston chamber. With this construction, the substantial space normally taken by rotating bearings between the cylinder and a stationary housing is saved and, of course, there are no bearings to wear.

In summary, the present invention provides a rotary cylinder that provides low friction relative to a stationary distributor housing so as to equal or exceed ball bearing type mountings in reducing horsepower loss, that is less expensive and occupies less space than a ball bearing type mounting for a distributor, that does not leak oil even when hot and that uses less oil than known fluid bearing distributors, and that runs extremely cool.

While in the foregoing disclosure a preferred embodiment of the invention has been disclosed, numerous modifications or alternatives may be made therein without departing from the spirit or scope of the invention.

What is claimed is:

1. In a rotary hydraulic cylinder for operating an actuator of a rotary work holder and having an external cylindrical bearing surface, a piston chamber within the cylinder, an axially movable piston in the chamber connected with the actuator, a non-rotary fluid distributor surrounding the bearing surface of the cylinder and having an inner cylindrical bearing surface mating therewith, two axially spaced grooves in one of the bearing surfaces, a first fluid inlet and first fluid outlet in the fluid distributor each connected with one of the two spaced grooves, at least two passageways associated with the cylinder each communicating between one of the two spaced grooves and opposite ends of the piston chamber, and a plurality of cavities in the inner cylindrical bearing surface of the fluid distributor communicating through restrictive passageways with conduit means to provide fluid thereto at a pressure different from that supplied to the spaced grooves, and means including an annular drain groove in one of said cylindrical bearing surfaces located axially between a plurality of cavities and the said two spaced grooves to interrupt axial flow of fluid between the bearing surfaces and thereby isolate said cavities and spaced grooves, each from fluid introduced to the other.

2. A rotary cylinder as set forth in claim 1 wherein the bearing surface between the drain groove and the plurality of cavities is less than one-half as wide axially of the distributor as the bearing surface between the drain groove and the adjacent one of said two spaced grooves.

3. A rotary cylinder as set forth in claim 1 including two axially spaced groups of peripherally spaced cavities on opposite sides of the said two axially spaced grooves, the improvement further comprising two drain grooves each located between one of said two axially spaced grooves and one of said two groups of cavities.

4. A rotary cylinder as set forth in claim 3 including two additional drain grooves in one of said bearing surfaces, each one of said two additional drain grooves being adjacent opposite axial ends of the fluid distributor beyond the said groups of spaced cavities.

5. A rotary cylinder as set forth in claim 3 wherein the two spaced grooves and two drain grooves are annular and continuous, and are formed in the bearing surface of the fluid distributor.

6. A rotary cylinder as set forth in claim 5 including two additional drain grooves in the bearing surface of the fluid distributor, each one of said two additional drain grooves being adjacent opposite ends of the fluid distributor and beyond the said groups of spaced cavities.

7. A rotary cylinder as set forth in claim 6 including an axially extending drain conduit in the fluid distributor in direct communication with the annular drain grooves.

8. A rotary cylinder as set forth in claim 7 wherein the two additional drain grooves adjacent the opposite ends of the bearing surface of the fluid distributor are constructed of a size to conduct most but not all of fluid supplied to the bearing surface that flows toward the ends of the bearing surface to the drain conduit.

9. The actuator of claim 8 including two annular collecting grooves in the fluid distributor adjacent each end of the bearing surface and spaced outwardly from the said two additional drain grooves, said collecting grooves facing an outer surface of the rotary cylinder and communicating with the drain conduit, and a plurality of narrower annular grooves in an outer surface of the rotary cylinder disposed opposite each of the two collecting grooves.

10. A rotary cylinder as set forth in claim 1 in which the drain groove has an outlet to a drain and provides an effective drain outlet area to the bearing surface that is at least 15 times greater than the sum of the fluid inlet area provided by the restrictive passageways to the cavities and the bearing gap area defined between the respective said bearing surfaces at an adjacent one of said two spaced grooves.

11. A rotary cylinder as set forth in claim 1 in which bearing surfaces are relieved by recess means including said grooves and cavities over at least 30 percent of the bearing area.

12. In a rotary work holder actuator for a machine tool: a rotary cylinder, an axially movable piston in the cylinder for actuating a work holder of a machine tool, a fluid distributor surrounding a portion of the rotary cylinder and having an inner bearing surface mating with said portion, a ring of peripherally spaced cavities in the inner bearing surface, a first annular groove in the bearing surface for receiving fluid under pressure and transferring fluid to the rotary cylinder to actuate the piston, a second annular groove in the bearing surface for exhausting fluid received from the rotary cylinder when the piston is actuated, at least one annular drain groove in the inner bearing surface between the first and second annular grooves and the ring of peripherally spaced cavities whereby the ring of peripherally spaced cavities is isolated from fluid received by the first and second annular grooves, and means to introduce fluid to said distributor and rotary cylinder.

13. An actuator as set forth in claim 12 including one fluid inlet to one of the said first and second annular grooves and a separate fluid inlet connected with the spaced cavities.

14. An actuator as set forth in claim 13 including restrictive passageways between each cavity and the said separate fluid inlet.

15. An actuator as set forth in claim 12 including a passageway extending peripherally within the distributor connected with a plurality of individual passageways that communicate with individual peripherally spaced cavities, and a port for introducing fluid to the peripheral passageway.

16. An actuator as set forth in claim 15 wherein the said individual passageways include an axially extending portion and a generally radially extending portion, and wherein the radially extending portion is of smaller diameter than the axial portion and the peripheral passageway.

17. In a rotary work holder actuator for a machine tool: a rotary cylinder, an axially movable piston in the cylinder for actuating a work holder of a machine tool, a generally cylindrical fluid distributor surrounding an outer bearing surface portion of the rotary cylinder and having an inner bearing surface mating with said portion, passageways in the distributor inner bearing surface for receiving fluid under pressure and transferring fluid to the rotary cylinder to actuate the piston and for exhausting fluid received from the rotary cylinder when the piston is actuated, means to supply and exhaust fluid to and from said passageways, two groups of peripherally spaced cavities in the inner bearing surface with one group adjacent each opposite end of the distributor, means to supply fluid to the groups of cavities, separate means to supply and exhaust fluid to and from the said passageways, and an annular drain groove in one of said bearing surfaces spaced axially between each group of cavities and said passageways.

18. An actuator as set forth in claim 17 wherein the means to supply fluid to the groups of cavities includes restrictive passageways, the annular drain grooves connect to a drain and the effective drain outlet area from the bearing surface to the drain is at least 15 times greater than the fluid inlet area to the bearing surface.

19. An actuator as set forth in claim 17 wherein the inner and outer bearing surfaces are spaced to provide a bearing gap or clearance and have recess means including said grooves, cavities, and passageways that substantially increase the distance between the two surfaces over at least 30 percent of the adjacent bearing areas of the surfaces.

(References on following page)

References Cited

UNITED STATES PATENTS

| | | | |
|---|---|---|---|
| 1,905,234 | 4/1933 | Labberton | 308—36.4 |
| 1,906,715 | 5/1933 | Penick | 308 |
| 2,812,186 | 11/1957 | Carlsen et al. | 279—4 X |
| 2,835,227 | 5/1958 | Gamet | 92—106 |

FOREIGN PATENTS

| | | |
|---|---|---|
| 640,706 | 5/1962 | Canada. |
| 875,980 | 7/1942 | France. |
| 513,390 | 10/1939 | Great Britain. |
| 639,293 | 6/1950 | Great Britain. |

MARTIN P. SCHWADRON, *Primary Examiner.*

I. C. COHEN, *Assistant Examiner.*

U.S. Cl. X.R.

279—4; 308—122